(12) United States Patent
Uwabo et al.

(10) Patent No.: US 6,366,433 B1
(45) Date of Patent: Apr. 2, 2002

(54) LARGE-CAPACITY MAGNETIC DISK DRIVE HAVING HEAD LOAD PRESSURE ADJUSTMENT

(75) Inventors: Tsuneo Uwabo; Yoshihiro Okano; Eiichi Yoneyama; Yoshinori Tangi, all of Kanagawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/503,842

(22) Filed: Feb. 15, 2000

(30) Foreign Application Priority Data

Feb. 24, 1999 (JP) ............................................. 11-047253

(51) Int. Cl.[7] .................................................. G11B 5/54
(52) U.S. Cl. .................................. 360/294.7; 360/246.1
(58) Field of Search ........................... 360/254.1, 246.1, 360/246.3, 294.7

(56) References Cited

U.S. PATENT DOCUMENTS

| | | | | |
|---|---|---|---|---|
| 4,089,029 A | * | 5/1978 | Castrodale et al. | ...... 360/99.05 |
| 4,343,025 A | * | 8/1982 | Kronfeld et al. | ............. 360/104 |
| 4,437,132 A | * | 3/1984 | Shimaoka | .................... 360/105 |
| 4,863,039 A | * | 9/1989 | Kondo et al. | ................. 209/538 |
| 4,875,119 A | * | 10/1989 | Ando et al. | ................... 360/105 |
| 4,933,795 A | * | 6/1990 | Nigam | ......................... 360/121 |
| 5,666,334 A | * | 9/1997 | Tokuyama et al. | ............. 369/14 |
| 5,923,494 A | * | 7/1999 | Arisaka et al. | ........... 360/78.02 |
| 5,998,947 A | * | 12/1999 | Shimizu et al. | .............. 318/268 |

* cited by examiner

Primary Examiner—Brian E. Miller
(74) Attorney, Agent, or Firm—Whitham, Curtis & Christofferson, PC

(57) ABSTRACT

Head load pressure generation means 36 is provided that flexibly supports an upper read/write head 25, via a leaf spring 27 attached to a main body 22, that moves forward and backward along the tracks on a magnetic data recording medium 3, and that adjusts the head load pressure applied to the upper read/write head 25 in accordance with whether a high-density or a low-density magnetic data recording medium is employed. Using this means, the head load pressure and the revolutions of a chucking motor are adjusted in accordance with whether a high-density or a low-density magnetic data recording medium is employed.

11 Claims, 4 Drawing Sheets

LARGE-CAPACITY MAGNETIC DISK DRIVE HAVING HEAD LOAD PRESSURE ADJUSTMENT

BACKGROUND OF INVENTION

1. Field of Invention

The present invention relates to a magnetic disk drive for reading and writing data on a magnetic disk, and relates in particular to a large-capacity magnetic disk drive that can handle improved, large-capacity magnetic disks having design features that surpass those of conventional magnetic disks.

2. Related Art

As data storage capacity has increased, or as software application programs have become larger, an increase in the capacities of magnetic disks has become obligatory, and as a result, the capacities of hard disks have been increased and various types of large-capacity storage devices have been developed.

Furthermore, by using recently developed techniques, conventional magnetic disk drives, i.e., so-called floppy disk drives, have been improved and can read and write both conventional low-density (2HD or 2DD) magnetic disks and magnetic disks having much larger capacities.

For example, a thin and compact read/write head is presently being employed that considerably narrows the pitches of tracks on a magnetic data recording medium, and in this manner, provides a considerable increase in the number of tracks. The use of such heads, when employed with chucking motors, motors that can change their speeds so that they correspond to those (e.g., 300 rpm or 360 rpm) appropriate for reading and writing low-density magnetic disks or to those (e.g., 3600 rpm or higher) appropriate for reading and writing high-density magnetic disks, can greatly increase the reading/writing speeds for magnetic data recording media. As a result, while maintaining compatibility with conventional flexible disks, provision is also made for the employment of magnetic disks having large capacities.

For this type of large-capacity magnetic disk drive, the technique for substantially extending the service life of the read/write head is discussed. According to this technique, the read/write head is shaped so that when a magnetic disk rotates rapidly, the head floats slightly above the surface of the magnetic disk, supported by pressure and an air stream that flows across the head. Therefore, when a speed (e.g., 3600 rpm) appropriate for reading and writing a high-density magnetic disk is selected, the read/write head can be prevented from directly contacting the magnetic recording medium and progressively abrading it.

As is described above, for a large-capacity magnetic disk drive, in order to reduce the abrasion caused by a read/write head, the head is supported by an air stream generated while revolving at high-speed so that it floats slightly above the surface of a magnetic disk. Also, a magnetic data recording medium that is used as a magnetic disk is considerably thinner than a magnetic data recording medium that is used as a hard disk. Therefore, when the disk revolution speed is changed to high, the data recording medium may be greatly deflected by negative pressure that is exerted near a shutter, so that under an abnormally high pressure condition it may come into contact with the read/write head, and due to this pressure, abnormal abrasion of the read/write head may occur.

SUMMARY OF INVENTION

Since, as a technical problem, the head-load pressure placed on the read/write head while it is revolving at high speed must be set in order to regulate this type of deflection, the objective of the present invention is the resolution of this problem.

To achieve the above objective, according to the present invention, a large-capacity magnetic disk drive comprises:

a head main body, for moving forward and backward along the tracks on a magnetic data recording medium;

a pair of vertically arranged read/write heads, which are flexibly supported at the head main body and which flexibly contact both magnetic data recording faces of the magnetic data recording medium;

a chucking motor, for changing the rotation speed of the magnetic data recording medium so that the number of revolutions is appropriate for either a high-density magnetic recording medium or for a low-density magnetic recording medium; and head load pressure adjustment means, for adjusting, in consonance with the requirements for a high-density magnetic data recording medium or for a low-density magnetic data recording medium, a head load pressure for the pair of read/write heads exerted against the magnetic data recording faces of the magnetic data recording medium.

In addition, the head load pressure adjustment means includes:

a forcing member, for driving the top face of an upper carriage in a direction in which the head load is increased; and a solenoid, for, when one end of the forcing member is driven a first distance in the direction in which the head load pressure is increased, setting the head load pressure to a pressure that is appropriate for reading and writing a low-density magnetic recording medium, and for, when the end of the forcing member is driven a second distance, which is smaller by a predetermined value than the first distance, in the direction in which the head load pressure is increased, setting the head load pressure to a pressure that is appropriate for reading and writing a high-density magnetic data recording medium.

DETAILED DESCRIPTION OF PREFERRED EMBODIMENTS

One embodiment of the present invention will now be described in detail while referring to FIGS. 1 to 7.

First, to easily understand the present invention, the basic structures of a magnetic disk 21 and a magnetic disk drive 7 will be explained while referring to FIGS. 1 and 2.

Figure 1:
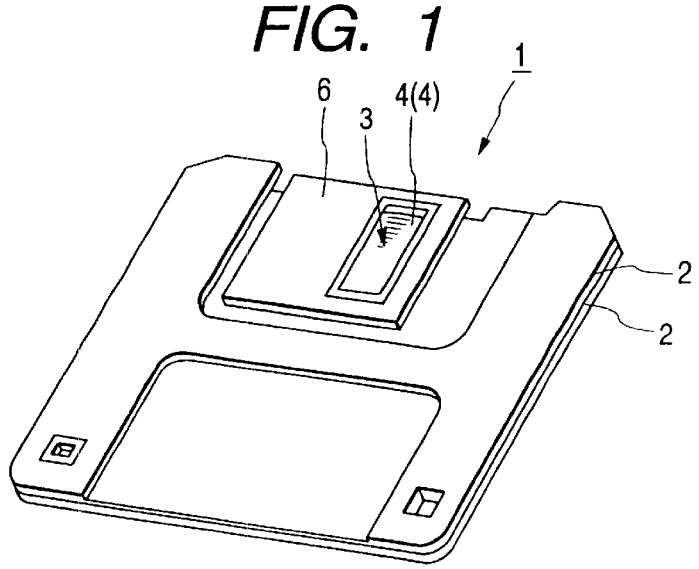
FIG. 1 is a perspective view of a magnetic disk according to the invention.

For the magnetic disk 1 shown in FIG. 1, rotatably encased by a pair of shells 2, which are bonded together, one atop the other, is a disk-shaped magnetic data recording medium 3 having two data recording faces 5, whereon magnetic data are recorded. Each of two windows 4, one of which is formed in each of the shells 2, expose an area on a corresponding data recording face 5 that extends radially outward across the tracks of the magnetic data recording medium 3 and that has a predetermined width in the track sector direction. A spring driven shutter 6 that is fitted over and slides along the forward ends of the shells 2 opens and closes the windows 4.

Figure 2:
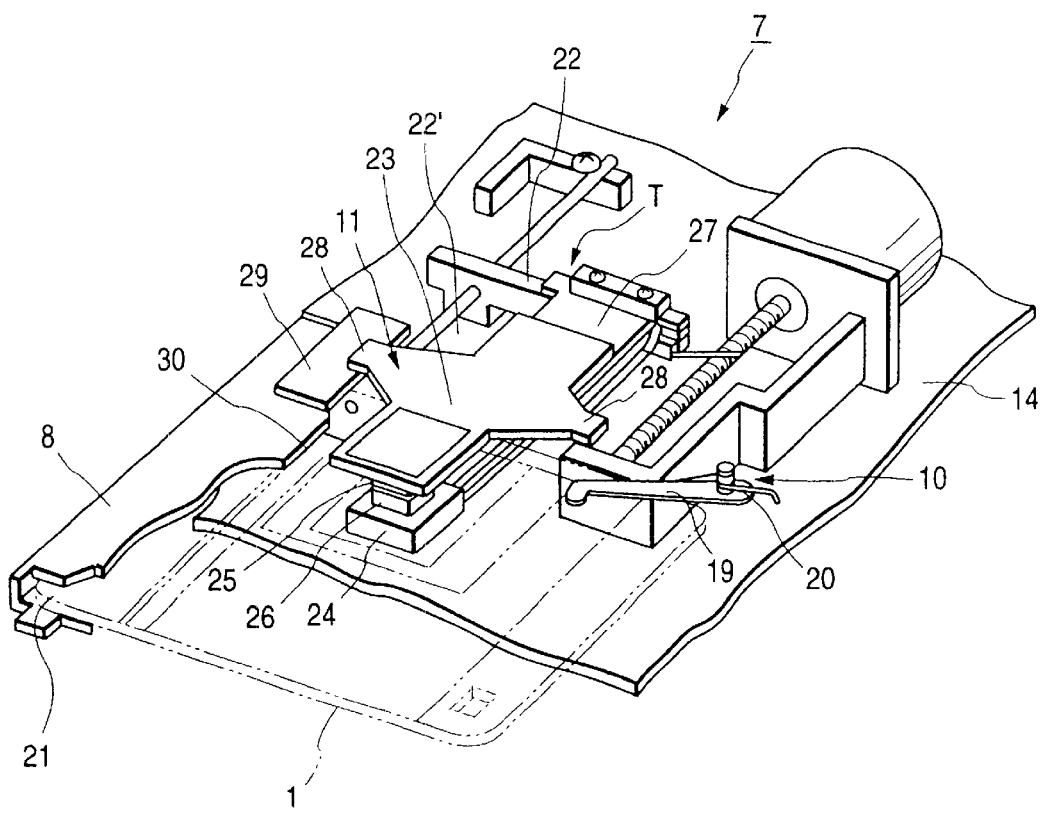
FIG. 2 is a partially cutaway, perspective view of a magnetic disk drive according to the invention.

As is shown in FIG. 2, the magnetic disk drive 7 includes a disk holder 8, for accepting and holding a magnetic disk 1 that is inserted into the magnetic disk drive 7; a disk lifting unit 9, which will be described later, for moving from a disk insertion position to a disk reading/writing position a magnetic disk 1 held by the disk holder 8; an opening and closing lever unit 10, for opening and closing the shutter 6; a read/write head unit 11, for reading and writing magnetic data on the magnetic data according faces of the magnetic data recording medium 3; and a chucking motor, which will be described later, for rotating at a predetermined speed the magnetic data recording medium 3 of a magnetic disk 1 located at the disk reading/writing position.

Figure 3:
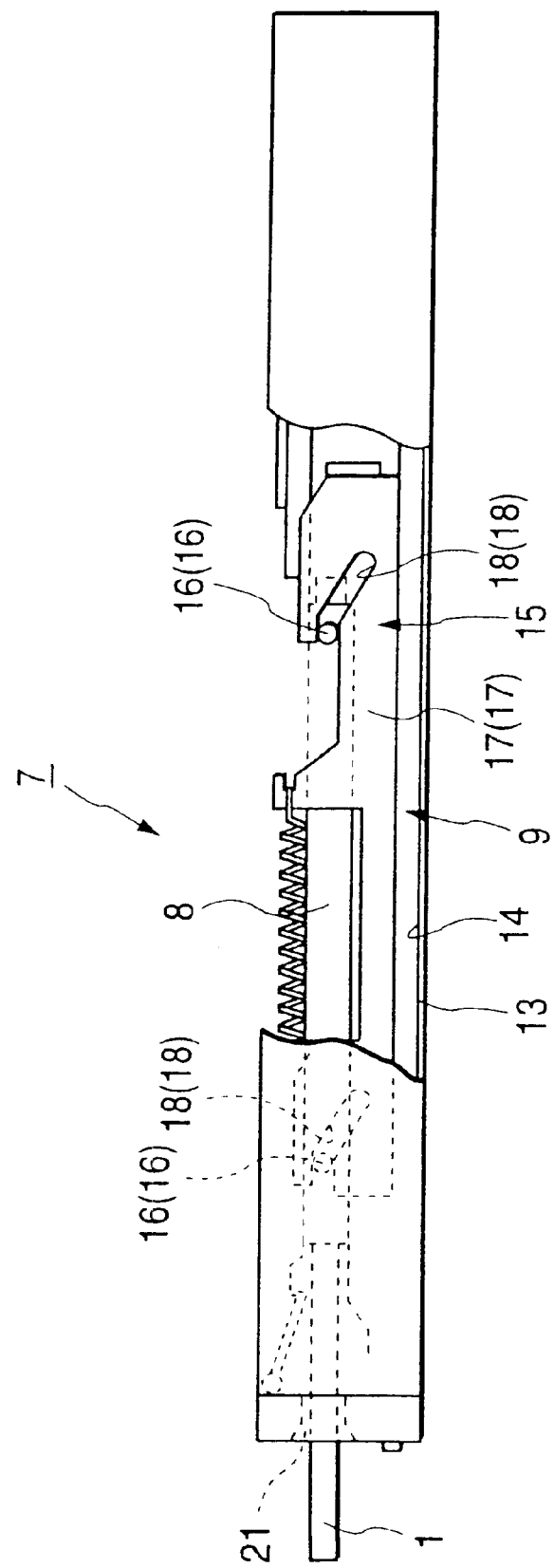
FIG. 3 is a side view of the magnetic disk drive according to the invention.

FIG. 3 is a side view of the magnetic disk drive 7, showing the disk lifting unit 9. As is shown in FIG. 3, a cam plate 15, which is located between the bottom face of the disk holder 8 and the top face of a chassis 13, can move forward and backward to lift the disk holder 8. Support shafts 16 are externally projected a predetermined distance from the right and left sides of the disk holder 8, and are supported by the top faces of flanges 17, which are located on both sides of the cam plate 15. With this arrangement, the disk holder 8 is held at the insertion position, and is moved down to the disk reading/writing position when the support shafts 16 descend along cam grooves 18 that are formed in the flanges 17.

Therefore, as the cam plate 15 is moved forward and backward, the disk holder 8 can be selectively positioned at the disk insertion position and at the disk reading/writing position.

Furthermore, as is shown in FIG. 2, the opening/closing lever unit 10 includes a lever 19 that rotates around the vertical axis, and a return spring 20 that returns the lever 19 to its initial position. When pressure is exerted on the distal end face of the lever 19 in the direction in which a magnetic disk 1 is inserted into an insertion port 21 for the disk holder 8, the lever 19 is rotated around the vertical axis, and as it rotates, it opens the shutter 8, which is secured in the fully open state when the magnetic disk 1 reaches the reading/writing position.

For the read/write head unit 11, an upper carriage 23 and a lower carriage 24 are vertically disposed, facing each other, in front of a head main body 22 that moves forward and backward along the tracks on the magnetic data recording medium 3. An upper read/write head 25 and a lower read/write head 26 are respectively attached to the facing distal ends of the upper carriage 23 and the lower carriage 24. The upper read/write head 25 and the lower read/write head 26 are flexibly supported by a leaf spring 27.

Also, support arms 28 that project outward from the right and left sides of the upper carriage 23 counter the reactive force exerted by the leaf spring 27 and hold the upper carriage 23 up at a predetermined height. A head load arm 29 is provided that moves the support arms 28 up to and down from the disk holder 8.

By removing that part of the face of the disk holder 8 that is located opposite the upper carriage 23 and the lower carriage 24, an opening 22 is formed in the disk holder 8, and the head load arm 29 is positioned at the middle of the opening 22'.

Figure 4:
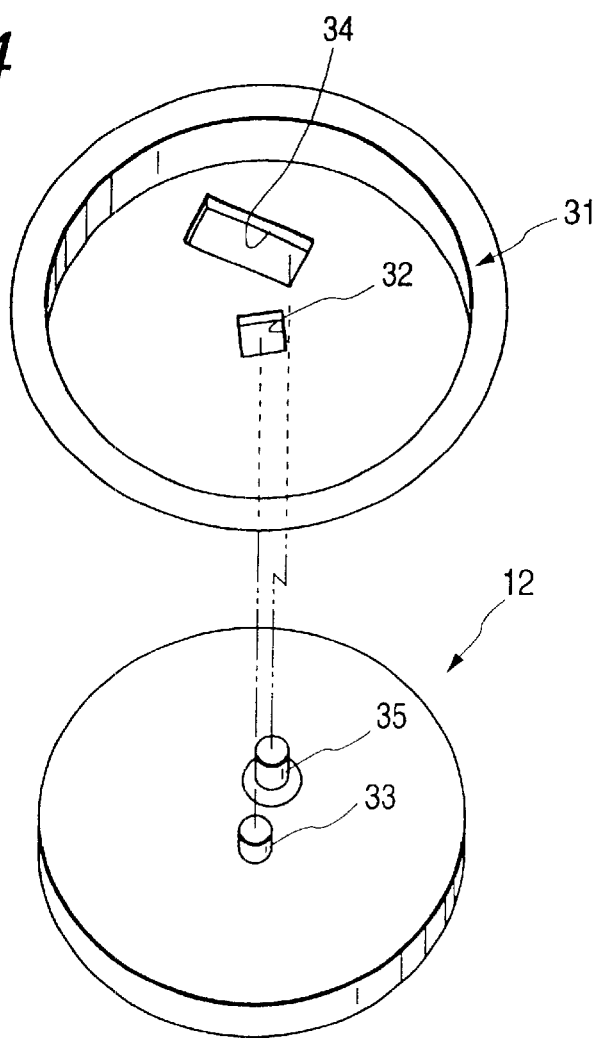
FIG. 4 is a perspective view for explaining the state wherein the chucking motor of the magnetic disk drive is connected to the hub of the magnetic disk according to the invention.

In FIG. 4 is shown a chucking motor 12 that rotates the magnetic data recording medium 3 in the magnetic disk 1. As is shown in FIG. 4, the chucking motor 12 includes: a motor shaft 33, which from below is inserted through a center hole 32 in a hub 31 that is securely fixed in the center of the data recording medium 3; and a chucking pin 35, which from below is inserted through a chucking pin insertion slit 34 in the hub 31. As the chucking pin 35, which is fitted through the checking pin insertion hole 34 of the hub 31, is rotated, it in turn rotates the magnetic data recording medium 3.

Therefore, in the magnetic disk 1, either pulse control is provided for the chucking motor 12, or a variable resistor or two or more different resistors (none of them shown) are provided between the chucking motor 12 and a power source, which supplies the driving power for the chucking motor 21, so that the resistors can be selected. Then, when the resistors are selectively changed in accordance with either a resistance that matches the revolutions (e.g., 300 rpm or 360 rpm) that are appropriate for reading/writing a low-density disk 1, or the resistance that matches the revolutions (e.g., 3600 rpm or higher) that are appropriate for reading/writing a high-density magnetic disk 1, either the revolutions (e.g. 300 rpm or 360 rpm) that are appropriate for reading/writing a low-density magnetic disk 1, or the revolutions (e.g. 3600 rpm or higher) that are appropriate for reading/writing a high-density magnetic disk 1 can be selected. When thin, compact read/write heads 25 and 26 are provided that are so shaped that the pressure and an air stream, which flows across the surfaces of the magnetic data recording faces when they are revolving rapidly, lifts and supports them so that they float slightly above the magnetic data recording faces, direct contact with the magnetic data recording medium 3 can be prevented. Therefore, while compatibility with the conventional, low-density magnetic disks 1 is maintained, the reading/writing of large-capacity magnetic disks 1 is implemented. However, abnormal abrasion of the upper and lower read/write heads 25 and 26, which results from the fluctuation of the heads 25 and 26 due to the deflection of the high-density magnetic disk 1 while it is rotated, can not satisfactorily be prevented.

Figure 5:
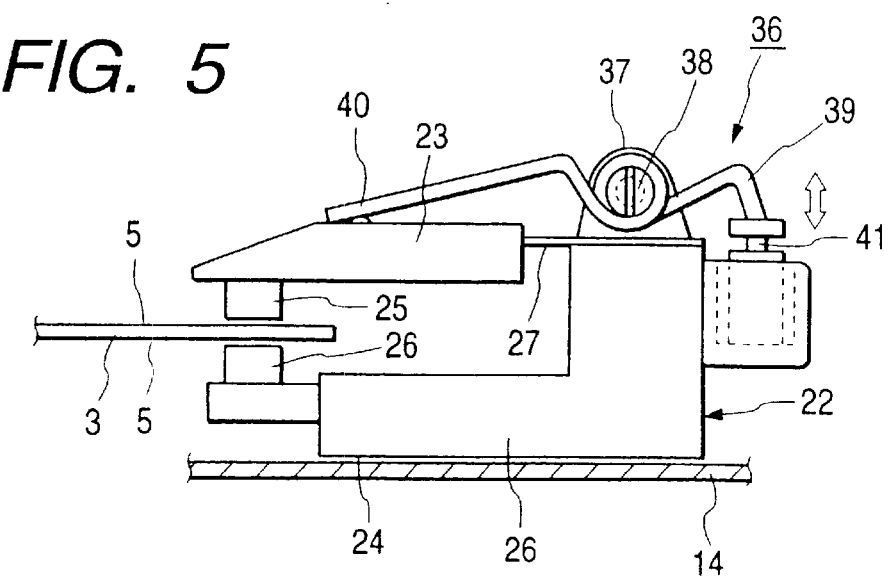
FIG. 5 is a detailed side view of an essential portion that is one example read/write head unit for the magnetic disk drive according to the invention.

In this embodiment, therefore, as is shown in FIG. 5, a head load pressure adjustment means 36 provided for the upper read/write head 25, so that an adjusted head load pressure is applied to the per read/write head 25, and as a consequence of adjustments made in the pressure, an adjusted head ad pressure is also applied to the lower read/write head 26.

Specifically, in the head load pressure adjustment means 36 shown in FIG. 5, a forcing member 37 is supported substantially at its center by a shaft 38, which is disposed across the top face of the head main body 22, and rotates around the horizontal axis so that it pushes the upper carriage 23 down. Additionally provided is a solenoid 41 that pushes an end 39 of the forcing member 37 upward so that an end 40 presses against the carriage 23 and forces it down. When the solenoid 41 in the ON state, its stroke is set so that the upper carriage 23 is driven down, thereby further flexing the leaf spring 27, and so that the head load pressure is appropriately adjusted for the reading/writing of a low-density magnetic disk 1. Then, when the solenoid 41 is in the OFF state, its stroke is set so that the reactive force of the leaf spring 27 supplies the head load pressure that holds the upper read/write head 25 in contact with the magnetic recording face 5 and that is appropriate for the reading/writing of a high-density recording disk 1. In this case, the head load pressure in the OFF state is set at a level at which, when the magnetic data recording medium 3 is rotated at high speed (e.g., 3600 rpm or higher) for the reading or writing of a high-density magnetic disk 1, the fluctuation of the magnetic data recording medium 3, which is occasioned by the pressure and an air stream that acts on the read/write heads 25 and 26, is suppressed. Therefore, abnormal abrasion of the read/write heads 25 and 26 due to fluctuation can be prevented, and data reading/writing with no errors is performed. The forcing member 37 may be either a flexible, elastic element, such as a spring, or a part for which an inflexible, rigid material is employed.

Figure 6:
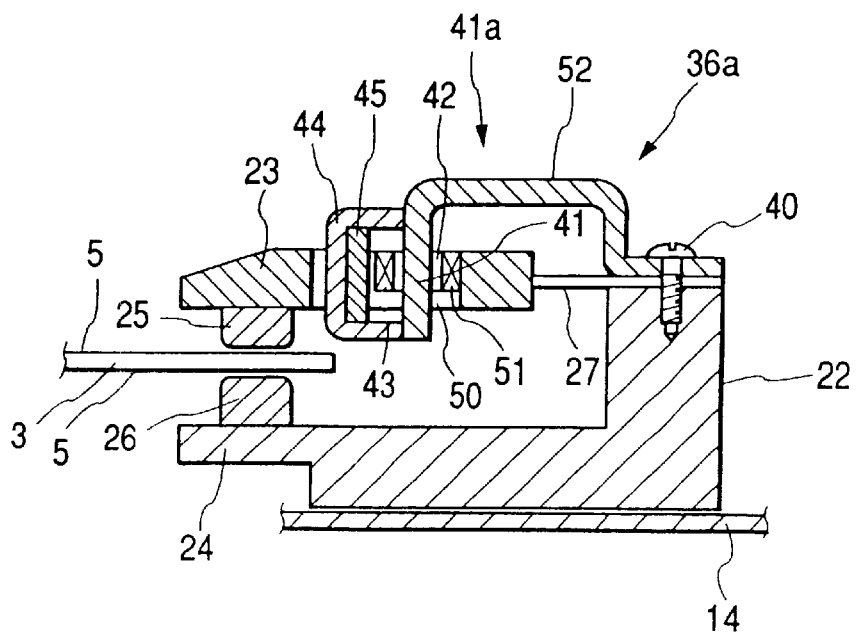
FIG. 6 is a detailed side view of an essential portion that is another example read/write head unit for the magnetic disk drive according to the invention.

FIG. 6 is a diagram showing another example of the head load pressure adjustment means 36.

As is shown in FIG. 6, in the illustration for head load pressure adjustment means 36a, located inside a vertically opening window 50 formed in the upper carriage 23 is an excitation coil 51, and fixed to the head main body 22 by a screw 40 is a first yoke 52, an iron core 41 of which is inserted from above into an internal space 42 in the excitation coil 51. In front of and at a predetermined distance from the first yoke 52, a second yoke 44 is secured to a window partition wall 43 of the upper carriage 23, and a permanent magnet 45 is mounted inside the second yoke 44. Specifically, in this example, the first yoke 52 is magnetized by electrifying the excitation coil 51. At this time, the leaf spring 27 is bent up slightly by its interaction with a magnetic field that is generated by a magnetic circuit that was established, and head load pressure is adjusted so that it is suitable for a high-density magnetic disk. When the supply of power is halted, the leaf spring 27 returns to its original, unflexed state, and the head load pressure is thereby adjusted so that it is suitable for a low-density magnetic disk. In a case where a head load pressure that is suitable for a high-density magnetic disk is to be set when the supply of power is halted, as is described above, naturally the leaf spring 27 must be set to provide a pressure level at which, when the magnetic data recording medium 3 is rotated rapidly (e.g., 3600 rpm or higher) to read or write data on a high-density magnetic disk 1, the fluctuation of the magnetic disk 1 due to the pressure and an air stream that acts on the read/write heads 25 and 26 is suppressed.

Figure 7:
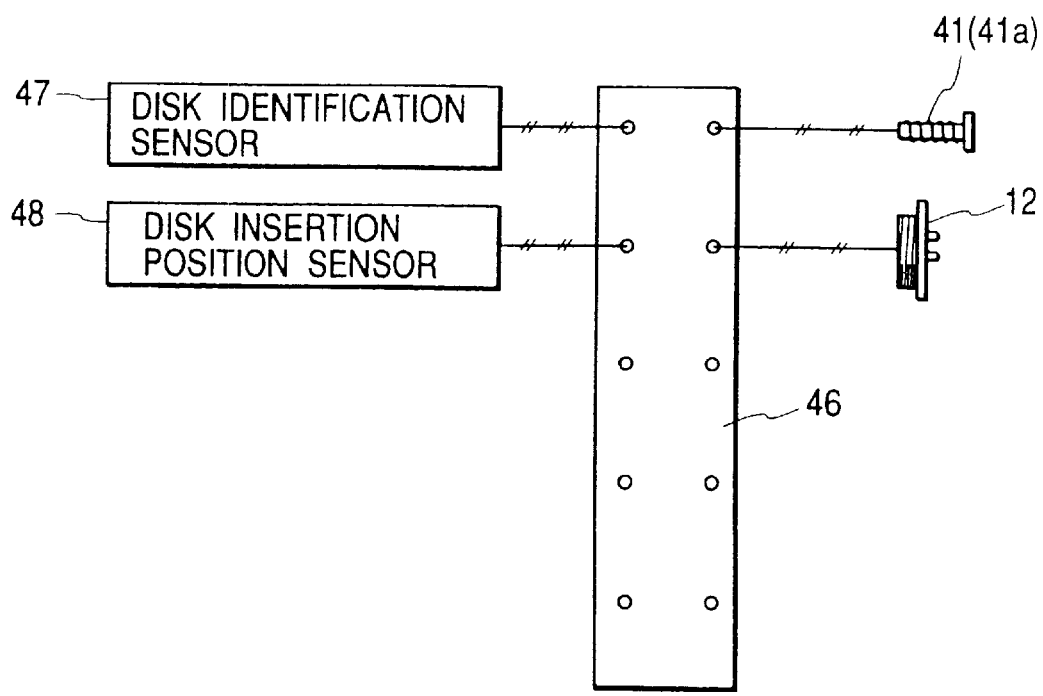
FIG. 7 is a block diagram showing a controller and various sensors located in the magnetic disk drive of the invention.

FIG. 7 is a block diagram illustrating a controller 46 and various sensors provided in the magnetic disk drive 7.

As is shown in FIG. 7, the controller 46 employs the values output by a disk identification sensor 47 and a disk insertion position sensor 48 to identify the type of magnetic disk 1 that has been inserted, and to determine whether the magnetic disk 1 is located at the read/write position. When the insertion of a high-density magnetic desk 1 is detected, the solenoid 41 (or a solenoid 41a) is set to ON or OFF, so that the urging force of the leaf spring 27, which flexibly supports the upper carriage 23 for the head main body 22, is reduced, and so that the head load pressure is adjusted and is appropriate for the reading/writing of a high-density magnetic disk 1. When the head load pressure has been set, either pulse control of the chucking motor 12 is exercised, or the resistor located between the chucking motor 12 and a power source (not shown) is changed for one that is appropriate for the reading/writing of the high-density magnetic disk 1. As a result, the chucking motor 12 is driven at a high speed that corresponds to the revolutions required for reading/writing the high-density magnetic disk 1. At this time, the pressure with which the upper read/write head 25 and the lower read/write head 26 contact the magnetic data recording faces 5 is sufficient to reduce the occurrence of fluctuations due to the pressure and a fast air stream. Therefore, abnormal abrasion does not occur, and there is little abrasion of the heads when data reading and writing is performed.

When the controller 46 ascertains that a low-density magnetic disk 1 has been inserted, it sets the solenoid 41 (or the solenoid 41a) to OFF or ON, so that the urging force of the leaf spring 27, which flexibly supports the upper carriage 23 for the main body 22, is increased, and so that the head load pressure is adjusted and is appropriate for the reading/writing of the low-density magnetic disk 1. Further, either pulse control of the chucking motor 12 is exercised, or the resistor that connects the chucking motor 12 to the power source is changed for one that is suitable for the reading/writing of the low-density magnetic disk 1. As a result, the chucking motor 12 is driven at a low-rotation speed that can handle the reading/writing of a low-density magnetic disk 1, and so that the appropriate data reading/writing can be performed for the low-density magnetic disk 1.

The solenoid of the head load pressure adjustment means may be replaced by a double-acting cylinder that is powered by pneumatic or hydraulic pressure, or by a single-acting cylinder that is compressed pneumatically or by the reactive force exerted by a return spring, or it may also be replaced by an actuator that adjusts the head load pressure by rotating a screw shaft. Further, instead of being provided for the carriage, the head load pressure adjustment means may be provided for a frame, so that the load pressure can be adjusted by moving the carriage to the adjustment means.

In this manner, without departing from the scope of the invention, various modifications can be made that are integral to the invention.

According to the invention of the first and the second aspects, as is described in detail in the embodiment, a head load pressure adjustment means is provided that flexibly supports an upper read/write head, via a leaf spring attached to a head main body, that is moved forward and backward along tracks provided on in a magnetic data recording medium, and that adjusts the head load pressure for the upper read/write head in accordance with whether a high-density or a low-density magnetic data recording medium is employed. Since the head load pressure adjustment means adjusts the head load pressure and the revolutions of the chucking motor in accordance with whether a high-density or a low-density recording medium is employed, the use of this invention will yield substantial results; the abnormal abrasion of the read/write heads can be prevented; and reliable data reading/writing can be performed for an extended period of time.

What is claimed is:

1. A large-capacity magnetic disk drive comprising:
   a head main body moving forward and backward along tracks on a magnetic data recording medium;
   a pair of vertically arranged read/write heads flexibly supported at said head main body, each of said pair of read/write heads flexibly contacting one of two magnetic data recording faces of said magnetic data recording medium with a predetermined head load pressure;
   a chucking motor for rotating said magnetic data recording medium at a predetermined number of revolutions for one of a high-density magnetic recording medium and for one of a low-density magnetic recording medium by changing the rotation speed of said magnetic data recording medium; and head load pressure adjustment means for adjusting a head load pressure for said pair of read/write heads facing said magnetic data recording faces of said magnetic data recording medium in consonance with one of the requirements for rotation speed of a high-density magnetic data recording medium and a low-density magnetic data recording medium respectively.

2. A large-capacity magnetic disk drive according to claim 1, wherein said head load pressure adjustment means includes:

a forcing member for forcing the top face of an upper carriage in a direction in which said head load is increased; and a solenoid for setting said head load pressure to a pressure for reading and writing a low-density magnetic recording medium when one end of said forcing member is driven a first distance in said direction for increasing said head load pressure, and for setting said head load pressure to a pressure for reading and writing a high-density magnetic data recording medium when said end of said forcing member is driven a second distance, which is smaller by a predetermined value than said first distance, in said direction for increasing said head load pressure.

3. The magnetic disk drive according to claim 1, wherein said head load pressure adjustment means further comprises:

a forcing member for forcing the top face of an upper carriage in a direction in which said head load is selectively adjusted in accordance with a recording medium; and, pressure setting means for setting said head load pressure to a pressure for reading and writing one of a low-density magnetic data recording medium and a high-density magnetic data recording medium.

4. The magnetic disk drive according to claim 3, wherein said pressure setting means sets said head load pressure for reading and writing one of a low-density magnetic recording device and a high density magnetic recording device by driving one end of said forcing member a distance in said direction for increasing said head load pressure.

5. The magnetic disk drive according to claim 4, wherein said pressure setting means further comprises a spring-loaded structure.

6. The magnetic disk drive according to claim 4, wherein said pressure setting means further comprises a solenoid.

7. The magnetic disk drive according to claim 1, wherein said head load pressure adjustment means further comprises:

a forcing member for forcing the top face of an upper carriage in a direction in which said head load is selectively adjusted in accordance with a recording medium; and, pressure setting means for setting said head load pressure to a pressure for reading and writing a low-density magnetic recording medium and for setting said head load pressure to a pressure for reading and writing a high-density magnetic data recording medium.

8. The magnetic disk drive according to claim 7, wherein said pressure setting means sets said head load pressure for reading and writing a low-density magnetic data recording device by driving one end of said forcing member a first distance in said direction for increasing said head load pressure and sets said head load pressure for reading and writing a high-density magnetic data recording device by driving said end of said forcing member a second distance in said direction for increasing said head load pressure.

9. The magnetic disk drive according to claim 8, wherein said second distance is smaller than said first distance by a predetermined value.

10. The magnetic disk drive according to claim 8, wherein said pressure setting means further comprises a spring-loaded structure.

11. The magnetic disk drive according to claim 8, wherein said pressure setting means further comprises a solenoid.

* * * * *